United States Patent
Harmsen et al.

(10) Patent No.: US 10,392,997 B2
(45) Date of Patent: Aug. 27, 2019

(54) METHOD FOR OPERATING AN EXHAUST GAS AFTERTREATMENT DEVICE OF A MOTOR VEHICLE

(71) Applicant: Ford Global Technologies, LLC, Dearborn, MI (US)

(72) Inventors: Jan Harmsen, Simpelveld (NL); Mario Balenovic, Waalre (NL)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

(21) Appl. No.: 15/797,206

(22) Filed: Oct. 30, 2017

(65) Prior Publication Data

US 2018/0119593 A1  May 3, 2018

(30) Foreign Application Priority Data

Oct. 28, 2016  (DE) .......................... 10 2016 221 272

(51) Int. Cl.
| | |
|---|---|
| *F01N 9/00* | (2006.01) |
| *F01N 3/08* | (2006.01) |
| *F01N 3/10* | (2006.01) |
| *F01N 3/021* | (2006.01) |

(52) U.S. Cl.
CPC ............ *F01N 9/005* (2013.01); *F01N 3/021* (2013.01); *F01N 3/0814* (2013.01); *F01N 3/0842* (2013.01); *F01N 3/0864* (2013.01); *F01N 3/0871* (2013.01); *F01N 3/103* (2013.01); *F01N 9/002* (2013.01); *F01N 2550/20* (2013.01); *F01N 2900/1402* (2013.01); *F01N 2900/1602* (2013.01); *Y02A 50/2322* (2018.01); *Y02T 10/47* (2013.01)

(58) Field of Classification Search
CPC .............................. F01N 3/0864; F01N 9/005
See application file for complete search history.

(56) References Cited

U.S. PATENT DOCUMENTS

| | | | |
|---|---|---|---|
| 2003/0005685 A1* | 1/2003 | Lewis ....................... | F01N 3/20 60/285 |
| 2013/0028818 A1* | 1/2013 | Eckhoff ................ | F01N 3/0814 423/212 |

* cited by examiner

*Primary Examiner* — Jonathan R Matthias
(74) *Attorney, Agent, or Firm* — Burris Law, PLLC

(57) ABSTRACT

The present disclosure provides a method for operating an exhaust gas aftertreatment device for cleaning an exhaust gas flow of a motor vehicle with an internal combustion engine operated in normal mode with oxygen surplus. An oxygen store arranged downstream of an NOx storage catalyst of the exhaust gas aftertreatment device receives oxygen in normal mode, and during a regeneration mode emits oxygen for converting breakthrough hydrocarbons and/or carbon monoxide. The oxygen store is assigned to a particulate filter and/or an oxidation catalyst of the exhaust gas aftertreatment device. The particulate filter and/or the oxidation catalyst is arranged downstream of the NOx storage catalyst.

20 Claims, 4 Drawing Sheets

METHOD FOR OPERATING AN EXHAUST GAS AFTERTREATMENT DEVICE OF A MOTOR VEHICLE

CROSS-REFERENCE TO RELATED APPLICATIONS

This application claims priority to and the benefit of DE 102016221272.9 filed on Oct. 28, 2016. The disclosure of the above application is incorporated herein by reference.

FIELD

The present disclosure relates to a method for operating an exhaust gas aftertreatment device for cleaning an exhaust gas flow of a motor vehicle with an internal combustion engine operated with oxygen surplus in normal mode. The present disclosure furthermore concerns an exhaust gas aftertreatment device and a motor vehicle with such an exhaust gas aftertreatment device.

BACKGROUND

The statements in this section merely provide background information related to the present disclosure and may not constitute prior art.

Exhaust gas aftertreatment devices clean combustion gases after they have left the combustion chamber of an internal combustion engine driving the motor vehicle, using a mechanical, catalytic or chemical method, in order to comply with the legal pollutant limits.

Diesel engines and modern lean-mix petrol engines work in lean mode, i.e. with an oxygen surplus ($\lambda > 1$). Conventional three-way catalysts cannot therefore be used. The oxidation of CO (carbon monoxide) and $C_mH_n$ (incompletely burned hydrocarbons) is still possible with oxygen surplus, in a similar manner to a conventional three-way catalyst, but the NOx (nitrous oxide) must be temporarily stored. The catalytic reduction thereof takes place cyclically with a stoichiometric to rich exhaust gas mixture. Therefore, catalysts with additional chemical elements are required which allow storage of NOx, known as NOx storage catalysts.

In order to achieve this temporary storage of nitrous oxides in the NOx storage catalyst, a noble metal catalyst such as platinum, and an NOx storage component which is usually an earth alkali metal such as barium, are applied to suitable carriers. In the lean, i.e. oxygen-rich atmosphere, the nitrous oxides are oxidated under the effect of the noble metal catalyst, absorbed in the catalyst forming nitrates such as for example barium nitrate, and thus removed from the exhaust gas flow. Regular brief "richening" of the exhaust gas causes these reactions to proceed in the opposite direction, whereby the NOx molecules are returned to the exhaust gas flow and the reducing components present in the rich atmosphere, such as $C_mH_n$ and/or CO, are further reduced.

When the absorption capacity of the NOx storage catalyst is exhausted, the engine electronics set a rich, substoichiometric, reducing exhaust gas mixture for a few seconds. In this brief regeneration mode, the NOx temporarily stored in the catalyst is reduced to oxygen and hence the NOx storage catalyst is prepared for the next storage cycle. This procedure makes it possible to minimize the pollutant emissions from internal combustion engines operated with an air surplus, and observe pollutant limits.

Enrichment for performing such a regeneration mode of the NOx storage catalyst can be achieved by late fuel injection, by changing the ratio of the fuel quantity on main injection to the fuel quantity on post injection, by means of intake air throttling, by increased exhaust gas recirculation rates, or by other measures.

The duration and frequency of the regeneration modes are determined by the engine control unit as a function of the stored nitrous oxide quantity, exhaust gas temperature, exhaust gas mass flow and other parameters.

DE 10 2015 208 093 A1 discloses an arrangement for exhaust gas aftertreatment in an exhaust system, wherein the arrangement comprises an NOx storage catalyst, a three-way catalyst and, arranged upstream thereof, an SCR catalyst for selective catalytic reduction of nitrous oxides contained in the exhaust gas supplied to the SCR catalyst, wherein an oxygen storage capacity component (OSC) is provided in the SCR catalyst which stores oxygen under operating conditions with a lean exhaust gas mixture, and in operating phases with a rich exhaust gas mixture provides oxygen to support the reduction of nitrous oxides at the SCR catalyst.

However, during the regeneration mode, there may not be sufficient oxygen present to convert all breakthrough hydrocarbons (HC) and/or carbon monoxide (CO) leaving the NOx storage catalyst.

The issue of regenerating an exhaust gas aftertreatment device in which breakthrough hydrocarbons and/or carbon monoxide are also converted is addressed by the present disclosure.

SUMMARY

The present disclosure provides a method for operating an exhaust gas aftertreatment device for cleaning an exhaust gas flow of a motor vehicle with an internal combustion engine operated with oxygen surplus in normal mode, wherein an oxygen store arranged downstream of an NOx storage catalyst of the exhaust gas aftertreatment device receives oxygen in normal mode, and during a regeneration mode emits oxygen for converting breakthrough hydrocarbons and/or carbon monoxide, wherein the oxygen store is assigned to a particulate filter and/or an oxidation catalyst of the exhaust gas aftertreatment device, wherein the particulate filter and/or the oxidation catalyst is arranged downstream of the NOx storage catalyst. Thus, the present disclosure deviates from the proposal for converting all hydrocarbons and/or carbon monoxide completely during the regeneration mode in the NOx storage catalyst, and instead proposes only providing oxygen for this further downstream of the NOx storage catalyst. Thus, breakthrough hydrocarbons and/or carbon monoxide can be converted after leaving the NOx storage catalyst.

According to one form of the present disclosure, a coating containing cerium dioxide and/or zirconium dioxide is used as an oxygen store. Cerium dioxide is an oxide of the rare earth metal cerium and zirconium dioxide (formerly known as zirconic acid or zirconia) are compounds of the element zirconium. Cerium dioxide is used for example in catalysts of motor vehicles, and on an oxygen deficit oxidates carbon monoxide and surplus hydrocarbons. Also, the coating containing cerium dioxide and/or zirconium dioxide has a high oxygen storage capacity.

According to a further form, a regeneration mode is ended when a comparison of an oxygen value with a target oxygen value shows that the oxygen value is equal to or less than the target oxygen value. Comparison of the oxygen value with the target oxygen value establishes whether the oxygen store has become exhausted and therefore no longer provides sufficient oxygen for the conversion of breakthrough hydrocarbons and/or carbon monoxide. By ending regeneration mode, a switch occurs to lean mode in which the NOx storage catalyst again absorbs hydrocarbons and/or carbon monoxide, and thus no breakthrough of these substances is to be feared. Thus undesirable emissions are avoided.

According to a further form, the oxygen is determined using a model during regeneration mode. Therefore, the oxygen value is not determined by measurement, e.g. with an oxygen sensor, but indirectly using the model. The model links together measurement values for the temperature, e.g. the exhaust gas temperature which is indicative of the temperature of the oxygen store, the mass flow and the lambda value, in order to determine a value representative of the oxygen value as an output parameter. Thus the oxygen value can be determined without using an oxygen sensor.

According to a further form, the model is configured to take into account by adaptation aging effects of the exhaust gas aftertreatment device. For this, the model also supplies a lambda simulation value which is compared with a lambda value measured downstream of the particulate filter and/or the oxidation catalyst. Aging effects can lead to a slow reduction in the storage capacity of the oxygen store, and hence also of the oxygen content, which leads to a change in the measured lambda value. This leads to a shortening of the duration of the regeneration mode, since during a shortened regeneration mode, breakthrough hydrocarbons and/or carbon monoxide can be converted.

The present disclosure furthermore concerns an exhaust gas aftertreatment device and a motor vehicle with such an exhaust gas aftertreatment device.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
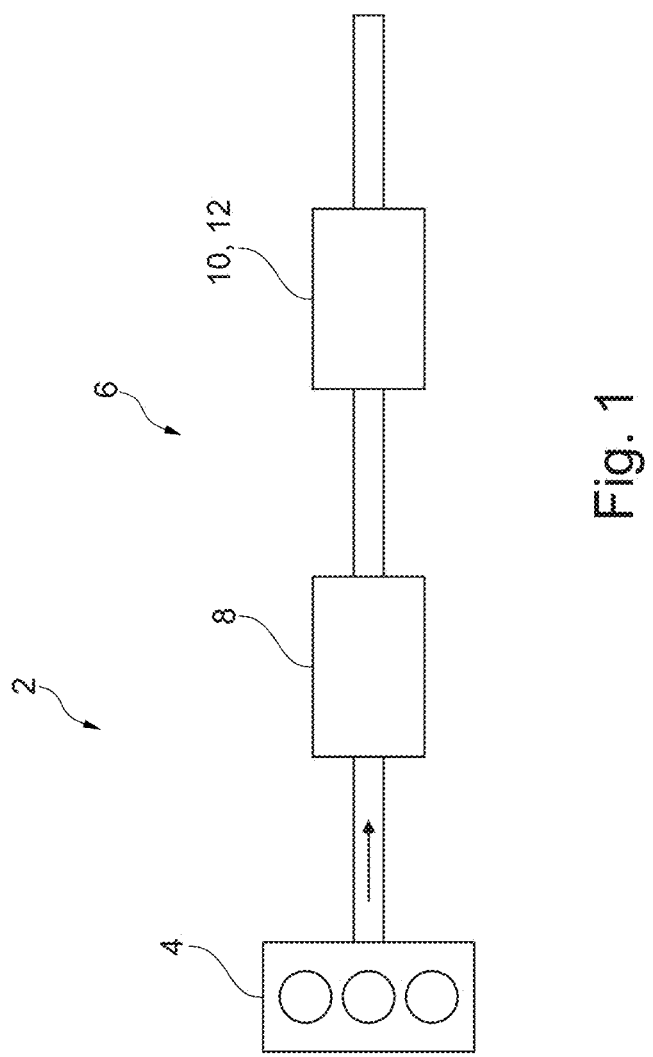
FIG. 1 is a block diagram showing an internal combustion engine and an exhaust gas aftertreatment device of a motor vehicle for performance of an exemplary form of a method according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows an internal combustion engine 4 and an exhaust gas aftertreatment device 6 of a motor vehicle 2.

The internal combustion engine 4 in the present exemplary form is a diesel engine, i.e. the diesel engine is operated in normal mode with an oxygen surplus ($\lambda > 1$). By deviation, the internal combustion engine 4 may also be configured as a petrol engine in lean mode to increase the engine efficiency.

In the present exemplary form, the exhaust gas aftertreatment device 6 connected downstream of the internal combustion engine 4 in the exhaust gas flow direction has an NOx storage catalyst 8.

By deviation from the exemplary form shown in FIG. 1, the exhaust gas aftertreatment device 6 may comprise further components (not shown) for exhaust gas aftertreatment, such as e.g. a diesel oxidation catalyst (DOC) for removing carbon monoxide (CO) and hydrocarbons ($C_mH_n$) from the exhaust gas flow, an SCR or SCRF catalyst for selective catalytic reduction of nitrous oxides, a blocking catalyst for retention of ammonia ($NH_3$) and/or a diesel particulate filter.

The NOx storage catalyst 8 is configured to store NOx (nitrous oxides). It has a structure with a suitable carrier with a noble metal catalyst such as platinum, and an NOx storage component e.g. an earth alkali metal such as barium.

The internal combustion engine 4 has an assigned control unit (not shown) which causes a switch from operation with oxygen surplus to a substoichiometric operation and vice versa, as will also be explained in more detail later. For this, the control unit has hardware and/or software components.

A particulate filter 10 is arranged downstream of the NOx storage catalyst 8. In the present exemplary form, the particulate filter 10 is formed as a diesel particulate soot filter for reducing the particles present in the exhaust gas. The particulate filter 10 is also known as a diesel particulate filter (DPF), corresponding to the particle origin, or a soot particulate filter (RPF), corresponding to the particle composition.

The particulate filter 10 downstream of the NOx storage catalyst 8, like the NOx storage catalyst 8, is arranged as close as possible to the internal combustion engine 4 in order to guarantee rapid heating of the NOx storage catalyst 8 and particulate filter 10, so that the two components are ready for operation quickly.

Furthermore, in the present exemplary form, an oxygen store 12 is provided which absorbs and temporarily stores oxygen during normal operation with a lean mixture, and emits oxygen during a regeneration mode with a rich mixture.

In the present exemplary form, the oxygen store 12 is assigned to the particulate filter 10 and formed by a coating which, in the present exemplary form, contains cerium dioxide ($CeO_2$) and/or zirconium dioxide ($ZrO_2$).

Figure 2:
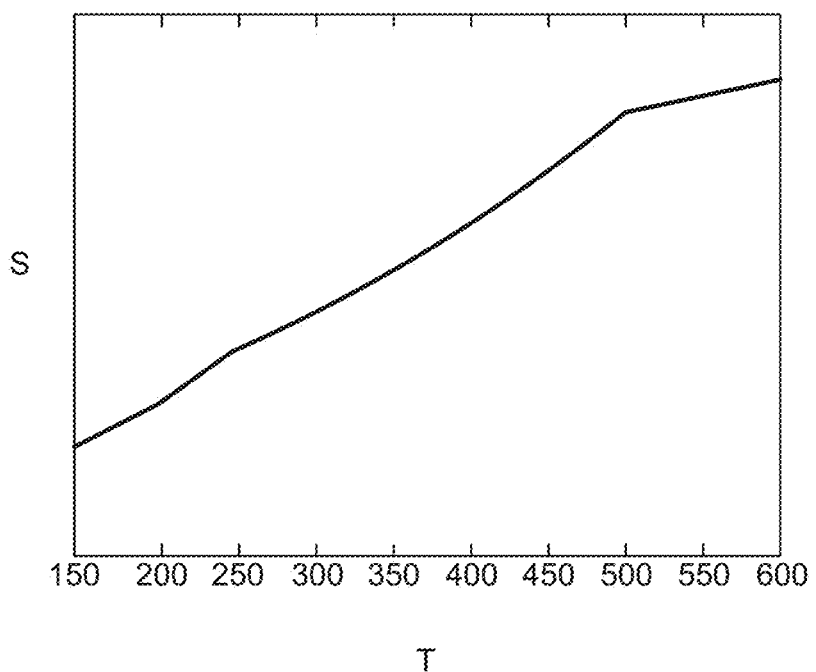
FIG. 2 shows a correlation between temperature and oxygen storage capacity according to the teachings of the present disclosure.

Reference is now made additionally to FIG. 2 which shows the correlation between the temperature T of the oxygen store 12 and its oxygen storage capacity S according to the present disclosure.

It is evident that in this example, the oxygen storage capacity S increases almost linearly with the temperature T in a temperature range from 150° C. to 500° C., and then increases further linearly with a smaller gradient from higher temperatures T.

Figure 3:
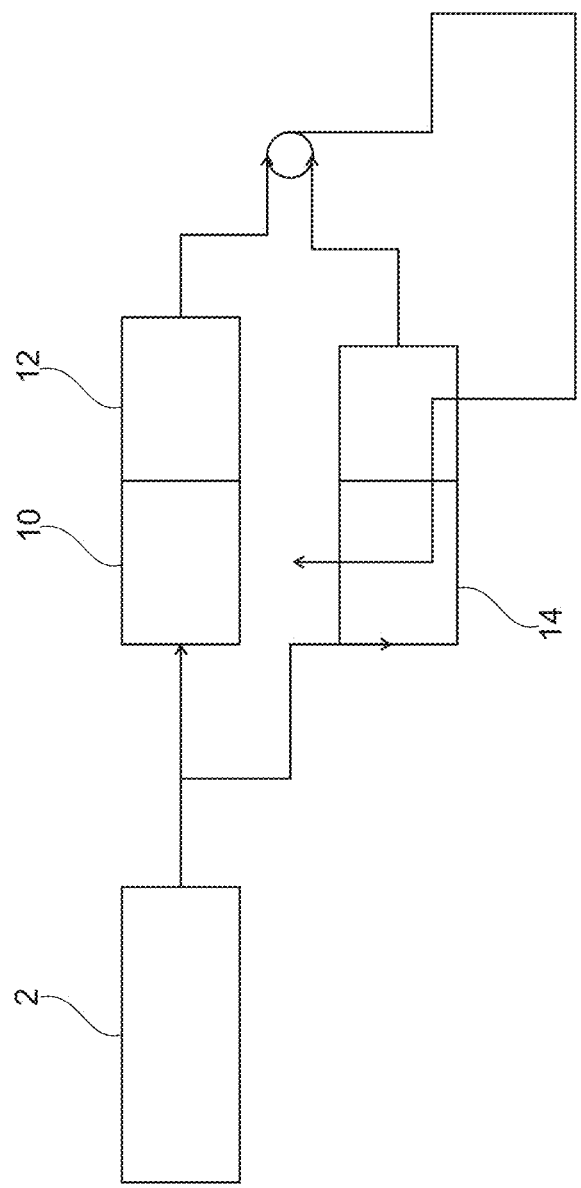
FIG. 3 is a block diagram showing an internal combustion engine and the exhaust gas aftertreatment device of FIG. 1, and an assigned model for performance of a further exemplary form of a method according to the present disclosure.

Reference is now also made to FIG. 3 which shows the internal combustion engine 4 and the exhaust gas aftertreatment device 6 with the NOx storage catalyst 8 and particulate filter 10.

FIG. 3 furthermore shows that a model 14 is provided with which an oxygen value O2LNT of the exhaust gas aftertreatment device 6 can be determined, which—as will be explained in more detail below—is used to control a switch from a regeneration mode with a rich mixture to a normal mode with a lean mixture.

The model 14 links together measurement values for the temperature T, such as e.g. the exhaust gas temperature which is indicative of the temperature of the oxygen store 10, the mass flow $m_{flow}$ and the lambda value $\lambda_{eng}$ on the downstream side of the internal combustion engine 4, in order to determine a value representative of the oxygen value O2LNT as an output parameter, e.g. according to the following equation:

$$dO2LNT/dt = f1(1-\lambda, \lambda<1, T, m_{flow}, O2LNT).$$

Furthermore, the model 14 is configured to also provide a lambda simulation value $\lambda_{mod}$ which is compared with the lambda value $\lambda_{meas}$ measured downstream of the particulate filter 10, so that aging effects can be taken into account.

For this, the model 14 links together, as well as the measured values for the lambda value $\lambda_{eng}$ downstream of the internal combustion engine 4, the temperature T, the mass flow $m_{flow}$ and the oxygen value O2LNT, e.g. according to the following equation:

$$\lambda_{mod} = f2(\lambda_{eng}, m_{flow}, O2LNT).$$

The model 14 may be implemented on a control unit (not shown), which for this has hardware and/or software components.

Figure 4:
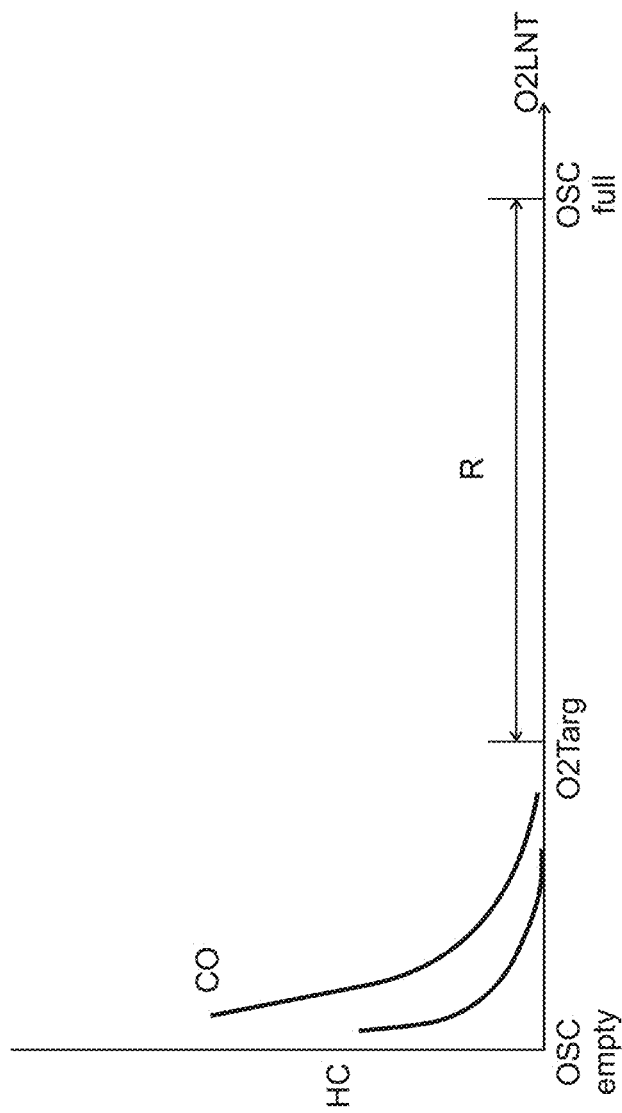
FIG. 4 shows various curves of breakthrough hydrocarbons and carbon monoxide according to the teachings of the present disclosure.

With additional reference now to FIG. 4, an exemplary form of a method according to the present disclosure for operating such an exhaust gas aftertreatment device 6 will now be described.

In normal mode, the internal combustion engine 4 is operated in the part load range with a lambda value of the supplied mixture which is greater than one, i.e. with an oxygen surplus. During normal mode, the NOx storage catalyst 8 absorbs nitrous oxides from the exhaust gas flow, and the oxygen store 12 absorbs oxygen from the exhaust gas flow which has passed through the NOx storage catalyst 8, and temporarily stores this until the oxygen store 12 is full (OSC full in FIG. 4). The particulate filter 10 removes soot particles from the exhaust gas flow.

In order to achieve a regeneration of the NOx storage catalyst 8, a regeneration mode R is performed. The duration and frequency of the regeneration mode R are determined by the control unit, e.g. as a function of the stored nitrous oxide quantity, the exhaust gas temperature, the exhaust gas mass flow and other parameters, and then initiated.

For this, the control unit actuates the internal combustion engine 2 such that the exhaust gas has a lambda value of less than one, in order to regenerate the NOx storage catalyst 8. For this, the control unit e.g. changes the time of fuel injection to achieve a late fuel injection, changes the ratio of the fuel quantity on main injection to the fuel quantity on post injection, changes the position of the throttle valve (air throttling), or increases the exhaust gas recirculation rate.

However, during regeneration mode R, the NOx storage catalyst 8 may not contain sufficient oxygen to convert completely all hydrocarbons and/or carbon monoxide leaving the NOx storage catalyst 8.

Such hydrocarbons and/or carbon monoxide leaving the NOx storage catalyst 8 are known as breakthrough hydrocarbons and/or carbon monoxide.

The breakthrough hydrocarbons and/or carbon monoxide reach the particulate filter 10 with the oxygen store 12.

During the regeneration mode R, the oxygen store 12 emits the oxygen temporarily stored and thus allows conversion of the breakthrough hydrocarbons and/or carbon monoxide.

The control unit ends the regeneration mode R when a comparison of the oxygen value O2LNT with a predefined target oxygen value O2Targ shows that the oxygen value O2LNT is equal to or less than the target oxygen value O2Targ.

This provides that a sufficient minimum quantity of oxygen is available to convert the breakthrough hydrocarbons and/or carbon monoxide. If however the oxygen quantity is below this minimum level, the result is a rise in the hydrocarbon and carbon monoxide concentration, as indicated in FIG. 4.

The oxygen value O2LNT is determined using the model 14. Furthermore, the model 14 provides the lambda simulation value $\lambda_{mod}$.

The lambda simulation value $\lambda_{mod}$ is compared with the lambda value $\lambda_{meas}$ measured downstream of the particulate filter 10, so that aging effects can be detected and taken into account. For this, the difference is formed between the measured lambda value $\lambda_{meas}$ and the lambda simulation value $\lambda_{mod}$, and parameters of the model 14 adapted accordingly.

Aging effects, in particular of the oxygen store 12, may lead to slow reduction in the storage capacity of the oxygen store 12 and hence also in the oxygen content, which leads to a change in the measured lambda value $\lambda_{meas}$.

Thus an age-induced tracking in the oxygen value O2LNT supplied by the model 14 is achieved, and operation with insufficient oxygen reserves is avoided. Aging leads to a reduction in the oxygen storage capacity of the oxygen store 12. Thus only a reduced oxygen quantity is available during regeneration mode. This leads to a shortening of the duration of the regeneration mode, because sufficient oxygen is available only for a shorter regeneration mode. Thus, a sufficient minimum quantity of oxygen is provided for converting breakthrough hydrocarbons and/or carbon monoxide.

What is claimed is:

1. A method for operating an exhaust gas aftertreatment device for cleaning an exhaust gas flow of a motor vehicle, the motor vehicle including an internal combustion engine operable in at least a normal mode and a regeneration mode, wherein the internal combustion engine is operated with an oxygen surplus in the normal mode and is operated with a rich mixture during the regeneration mode, the exhaust gas aftertreatment device including an oxygen store and an NOx storage catalyst, wherein the oxygen store is downstream of the NOx storage catalyst such that exhaust gases received by the oxygen store have passed through the NOx storage catalyst, the method comprising:
   operating the internal combustion engine in the normal mode in which the oxygen store receives lean exhaust gas from the NOx storage catalyst;
   absorbing, within the oxygen store, excess oxygen from the lean exhaust gas until the oxygen store is full;
   switching operation of the internal combustion engine to the regeneration mode while the oxygen store is full;
   operating the internal combustion engine in the regeneration mode to provide the NOx storage catalyst with rich exhaust gas; and
   converting breakthrough hydrocarbons and/or carbon monoxide within exhaust gas received from the NOx storage catalyst during the regeneration mode by releasing oxygen from the oxygen store.

2. The method as claimed in claim 1, wherein the oxygen store is a coating containing at least one of cerium dioxide and zirconium dioxide, the coating being disposed on at least one of a particulate filter and an oxidation catalyst.

3. The method as claimed in claim 1, further comprising:
determining an oxygen value of the oxygen store;
switching operation of the internal combustion engine from the regeneration mode to the normal mode based on the oxygen value;
comparing the oxygen value with a target oxygen value; and
ending the regeneration mode when the comparison of the oxygen value with the target oxygen value shows that the oxygen value is equal to or less than the target oxygen value.

4. The method as claimed in claim 3, wherein the oxygen value is determined using a model during regeneration mode.

5. The method as claimed in claim 4, further comprising: determining, via the model, aging effects of the exhaust gas aftertreatment device.

6. The method as claimed in claim 4, wherein the model is configured to provide a lambda simulation value ($\lambda_{mod}$).

7. The method as claimed in claim 6, wherein the lambda simulation value ($\lambda_{mod}$) is indicative of a lambda value ($\lambda_{eng}$) downstream of the internal combustion engine, temperature, mass flow ($m_{flow}$) and oxygen value (O2LNT).

8. The method as claimed in claim 6, further comprising:
measuring a lambda value ($\lambda_{meas}$) downstream of the NOx storage catalyst; and
comparing, via the model, the lambda simulation value ($\lambda_{mod}$) with the lambda value ($\lambda_{meas}$) to provide age-induced tracking in the oxygen value (O2LNT).

9. The method as claimed in claim 8, further comprising: controlling a duration of the regeneration mode, via a control unit, based on the age-induced tracking in the oxygen value (O2LNT) provided by the model.

10. The method as claimed in claim 3, wherein the oxygen value (O2LNT) is determined by temperature measurements indicative of at least one of temperature of the oxygen store, mass flow ($m_{flow}$), and a lambda value ($\lambda_{eng}$).

11. An exhaust gas aftertreatment device for cleaning an exhaust gas flow of a motor vehicle with an internal combustion engine operable with oxygen surplus in a normal mode and with a rich mixture in a regeneration mode, the exhaust gas aftertreatment device comprising:
an NOx storage catalyst;
an oxygen store arranged downstream of the NOx storage catalyst such that exhaust gas passing through the oxygen store is received from the NOx storage catalyst, the oxygen store being configured to absorb oxygen when the internal combustion engine is operated in the normal mode and being configured to emit oxygen for converting at least one of breakthrough hydrocarbons and carbon monoxide; and
a control unit configured to operate the internal combustion engine in the normal mode until the oxygen store is full, to switch operation of the internal combustion engine to the regeneration mode while the oxygen store is full, and to operate the internal combustion engine in the regeneration mode to regenerate the NOx storage catalyst.

12. The exhaust gas aftertreatment device as claimed in claim 11, wherein the oxygen store includes a coating containing at least one of cerium dioxide and zirconium dioxide, the coating being disposed on at least one of the particulate filter and the oxidation catalyst.

13. The exhaust gas aftertreatment device as claimed in claim 11, wherein the control unit is configured to determine an oxygen value of the oxygen store, and to end operation of the internal combustion engine in the regeneration mode when a comparison of an oxygen value measured downstream of the NOx storage catalyst with a target oxygen value shows that the oxygen value is equal to or less than the target oxygen value.

14. The exhaust gas aftertreatment device as claimed in claim 13, further comprising a model implemented on the control unit and configured for determining the oxygen value during the regeneration mode.

15. The exhaust gas aftertreatment device as claimed in claim 14, wherein the oxygen value is determined by temperature measurements indicative of at least one of temperature of the oxygen store, mass flow, and a lambda value.

16. The exhaust gas aftertreatment device as claimed in claim 14, wherein the model is configured to determine aging effects of the exhaust gas aftertreatment device.

17. The exhaust gas aftertreatment device as claimed in claim 14, wherein the model is configured to provide a lambda simulation value.

18. The exhaust gas aftertreatment device as claimed in claim 17, wherein the lambda simulation value is indicative of a lambda value downstream of the internal combustion engine, temperature, mass flow and oxygen value.

19. The exhaust gas aftertreatment device as claimed in claim 17, wherein the model compares the lambda simulation value with a lambda value measured downstream of the NOx storage catalyst to provide age-induced tracking in the oxygen value.

20. A motor vehicle with an exhaust gas aftertreatment device as claimed in claim 11.

\* \* \* \* \*